United States Patent

[11] 3,583,227

[72] Inventor Raymond C. Machler
 Lansdale, Pa.
[21] Appl. No. 814,296
[22] Filed Apr. 8, 1969
[45] Patented June 8, 1971
[73] Assignee Leeds & Northrup Company
 Philadelphia, Pa.

[54] ADSORBED GAS TYPE VACUUM GAUGE
 4 Claims, 7 Drawing Figs.
[52] U.S. Cl..................................................... 73/398
[51] Int. Cl..................................................... G01l 9/00
[50] Field of Search........................................... 73/398,
 388, 32, 517

[56] References Cited
 OTHER REFERENCES
 Darwin, " Development Of Friction Type Vacuum Gauges," Vacuum, Vol. 15, No. 3, March, 1965. pp. 99—111. Copy in class 73/398

Primary Examiner—Donald O. Woodiel
Attorney—Woodcock, Phelan & Washburn

ABSTRACT: A vacuum gauge of the vibrating element type variously referred to as a viscosity or friction type gauge. Such gauges are based upon the purported pressure dependence of molecular damping forces on a vibrating ekement mounted in an environment at low pressure. The determination of pressure may be made after initiation of vibration of the element, by either mechanical or electrical means, by determining the half decay time of the vibrations either optically or by electrical means or by measuring the energy necessary to maintain vibration of the element at a constant amplitude. The vibrating element of the present gauge is characterized by eeatures of construction which reduce damping thereof due to the internal friction loss to a negligible value thereby to unmask a newly discovered damping factor which renders the gauge useful for measuring pressure several orders of magnitude lower than heretofore possible.

PATENTED JUN 8 1971 3,583,227

ADSORBED GAS TYPE VACUUM GAUGE

BACKGROUND OF THE INVENTION

Viscosity or friction-type vacuum gauges, that is to say, those based upon the pressure dependence of molecular damping forces on a vane or filament swinging with a pendulumlike motion in a vacuum or a diaphragm or filament vibrated in a vacuum have been known for many years. In such gauges the moving element was set into motion by a blow on the gauge wall or by magnetic means and the time it took for the amplitude of the movement to decay to half its original value was measured as a function of pressure. These early gauges were of insignificant value to vacuum technology for measurement below about $10^{14}$ Torr. and were without a doubt not considered useful commercially due to their delicate construction and general unsuitability for use by unskilled workers. In recent years by the introduction of modern control and measuring techniques, gauges of the foregoing type have been developed such as a commercial instrument called REVA employing a taut filament supported in a magnetic field and which is claimed to have a useful measuring range from 760 to $10^{13}$ Torr. with an indication that the gauge construction lends itself to the making of a gauge having a useful sensitivity beginning at about $10^{15}$ Torr. and extending up to a pressure of about $10^3$ Torr. or higher. For a more complete description of the REVA gauge reference may be made to an article entitled, "'REVA' Friction Vacuum Gauge," W. Becker, VACUUM, No. 11, 1961, pp. 195 to 204. Additionally, the REVA gauge is described together with other "friction-type" vacuum gauges in an article by H. W. Drawin, entitled, "Development of Friction-Type Vacuum Gauges" appearing in VACUUM, Vol. 115, No. 3, Mar. 1965, pp. 99 to 111.

In these prior art vacuum gauges the mathematical expressions for analyzing gauge performance generally included a damping factor due to the friction of the molecules of residual gas which resulted from molecular bombardment of the vibrating element and a damping factor attributed to the internal friction of the material of the vibrating element such as a filament, ribbon, diaphragm, etc. This latter loss factor was considered determinative of the ultimate sensitivity of the gauge and heretofore it was believed impossible to measure vacuum with a friction-type gauge in excess of approximately $10^{16}$ Torr.

SUMMARY OF THE INVENTION

As a result of attempts to determine the degree of vacuum existing in optical pyrometer lamps, similar in construction to lamps disclosed and claimed in my issued U.S. Pat. No. 2,176,087, and having a filament characterized by a pair of oppositely disposed deep V- or U-shaped bends, one at each end of the filament adjacent the mounting points, I discovered that the damping factor heretofore apparently attributed to the internal friction of the material of the vibrating element and determining the ultimate sensitivity of a vacuum gauge is in fact comprised of two damping factors one of which under certain conditions far exceeds and masks the true damping factor attributable to the internal friction of the material of the vibrating element. In actual practice, I have found the latter may be rendered sufficiently small so that it may be ignored. Better to maintain a distinction between all damping factors of a vibrating element vacuum gauge the larger of the two damping factors which sometimes masks the effect of internal friction will hereinafter be referred to as a third damping factor attributed to the friction of gas adsorbed on the vibrating element in a manner later to be described. As a result of this discovery it becomes apparent to me that by suitably constructing, arranging, and properly treating a vibratile element the degree of vacuum, that is to say, the lower limit of pressure to which a vibrating filament-type gauge may be made to operate can be extended many orders of magnitude thereby to measure, for example, such low pressures as $10^{114}$ Torr.

In accordance with my invention a vacuum gauge is constructed having a suitably outgassed thin, flat filament characterized by oppositely disposed bends at the extremities thereof so that the damping factor ascribed to the internal friction of the material of the filament, when such a filament is mounted for vibration in a vacuum chamber, is reduced to such a low value that this factor may be ignored. A filament so mounted may be set into vibration by tapping the gauge and the half-decay time of the vibrating filament determined by observing the filament utilizing optical means or the filament may be set into vibration by electrical means and electrical means utilized to determine the decay time, as is well known by those skilled in the art.

It is also possible utilizing a filament constructed, supported, and treated in accordance with applicant's invention to produce and maintain a constant amplitude of vibration by electrical means and measure the power required to maintain the filament vibrating at constant amplitude as a measure of the vacuum in which the filament is disposed.

In addition to the foregoing it has been discovered that the calibration of a gauge having a filament with negligible internal friction in accordance with my invention will not only be dependent upon the residual gas or gases within the system but that instead of the calibration curves for such a gauge at pressures below $10^{14}$ Torr. being displaced in the order of the magnitude of the molecular weights for different residual gases in the system, it has been found that these curves will be displaced in what appears to be the order of the physisorption energies of the residual gases adsorbed on filament. From the foregoing it is postulated that a third loss factor does in fact exist in the form of gas adsorbed on the surface of the filament. This gas is more like a liquid in density than the surrounding gas. At lower pressures it is expected that the quantity of adsorbed gas diminishes as the pressure is reduced compared with the quantity which exists at higher pressures. This postulated change in the quantity of adsorbed gas is believed to change an energy loss factor characterized as friction due to back and forth movement of this quasi-liquid coating along a vibrating filament. The specific viscosity of a liquid is of the order of one thousand times that of a gas at atmospheric pressure, and perhaps a billion times that of a gas at $10^{13}$ Torr., hence a measurable loss is the result.

It is also believed that after cleaning up a vacuum gauge system having a filament mounted for low internal friction losses utilizing well-known bakeout and aging means, that subsequent heating of the filament with currents of predetermined different magnitudes in accordance with different physisorption energies of gases, that different gases, in a mixture of gases adsorbed on the filament of a gauge in accordance with my invention, may be driven off one at a time so that the apparatus of my invention may, to some degree, function as a residual gas analyzer. Detection of desorption of a gas, after a known heating current is applied, is effected by a change in a vibration parameter of the filament or by measuring step changes in pressure with a second gauge. This ability to detect a change in adsorbed molecules on a low internal loss vibratile element may additionally prove useful using, for example, a platinum coated filament to detect reactions catalyzed by the platinum.

BRIEF DESCRIPTION OF THE DRAWINGS

For a more detailed understanding of the invention reference should be had to the specification together with the accompanying drawings, in which.

DESCRIPTION OF THE PREFERRED EMBODIMENTS

Figure 1:
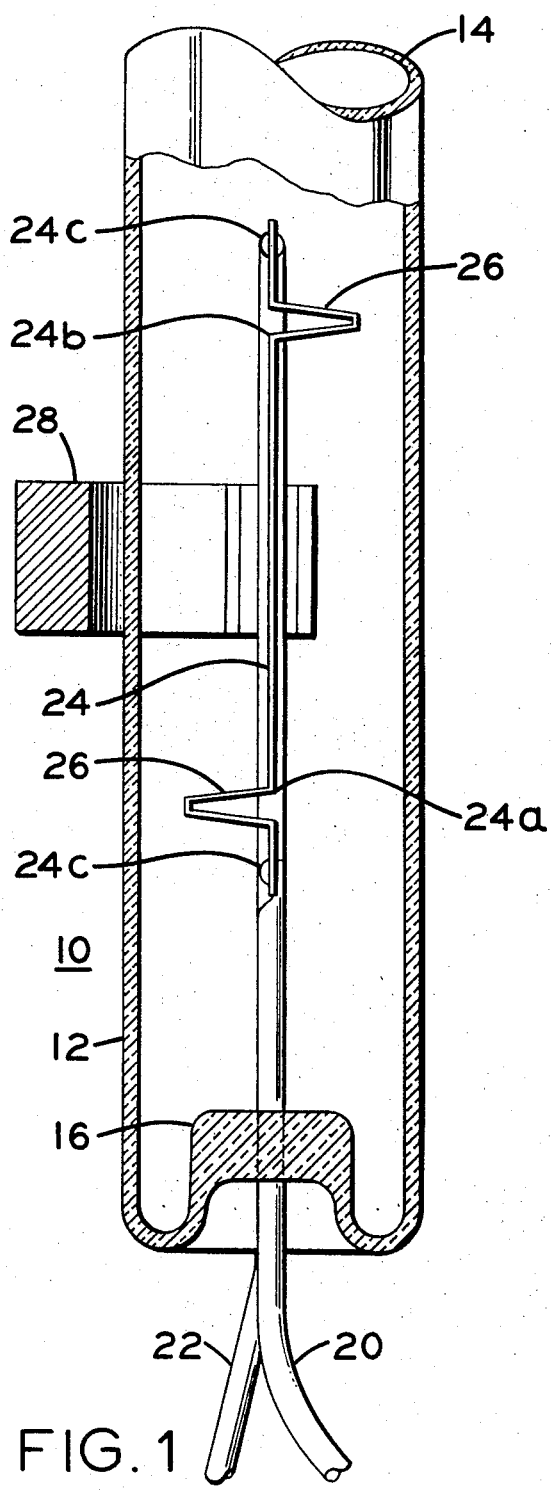
FIG. 1 is a top plan view of a vacuum gauge in accordance with applicant's invention.

FIG. 1 is a view on a much enlarged scale disclosing a gauge tube 10 comprised of a glass envelope 12 having an end 14 which may be connected to a vacuum system by any suitable means which will be vacuumtight. Such connections are generally made by a direct glass-to-glass connection with one glass element being fused to the other. The glass envelope 12 has a sealed end portion 16 through which are passed a pair of relatively heavy and rigid electrically conductive support members 20 and 22. These support members will preferably be made of a material sold under the trade name Kovar to effect a better vacuum seal with the glass in a manner well known to those skilled in the art.

Figure 2:
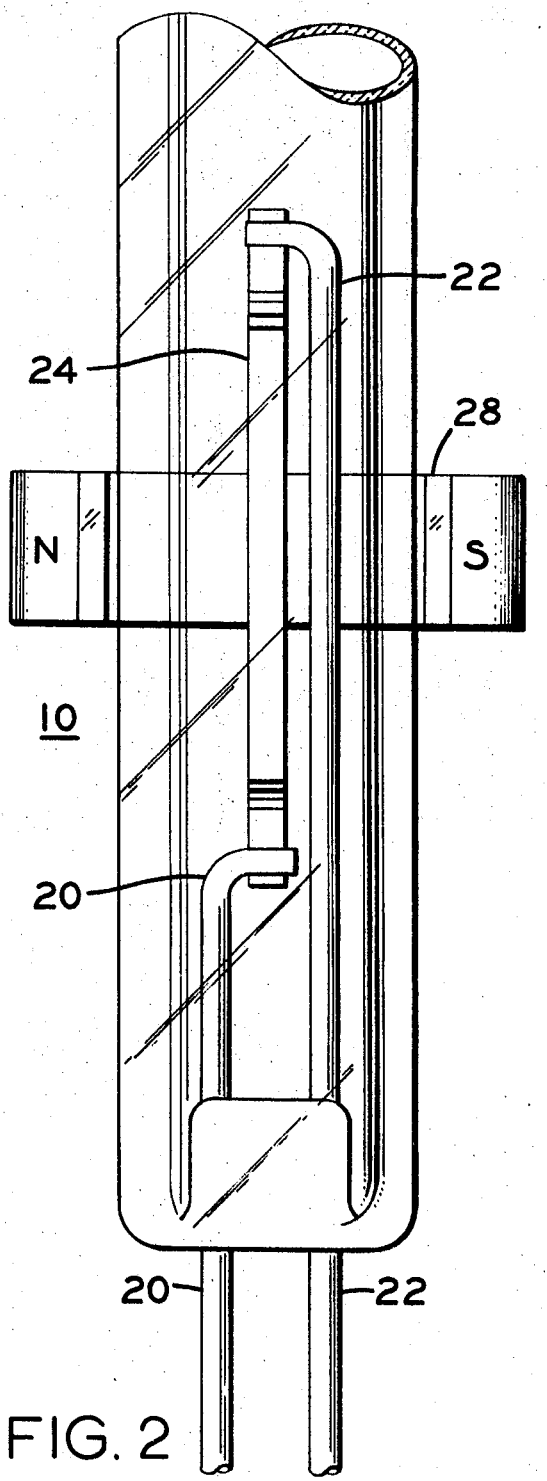
FIG. 2 is a side elevation of the vacuum gauge of FIG. 1.

As more clearly shown in FIG. 2, the support members 20 and 22 have a configuration for supporting a filament 24. The filament 24 has bends at each end comprising laterally extending portions 26 on opposite sides of the filament which is made of a thin flat metal ribbon. While other suitable structures may be designed to provide a low internal friction loss vibratory element, I have found a filament of the configuration illustrated to be satisfactory. The filament used has a central portion between the points 24a and 24b about one-half inch long and a length of material about one-half the length 24a 24b was allotted for each of the bent projections 26. The natural frequency of vibration of the bent portions of such a filament will be approximately equal to that of the length 24a to 24b. As such a filament is vibrated the shape of the bends at the bottom of each U-shaped portion tends to be preserved thus to render negligible the internal friction loss in the vibrating element and the central portion 24a to 24b not only moves in a direction perpendicular to the flat surface of the ribbon but additionally tends to move lengthwise. This lengthwise movement is believed to be important for reasons later to be set forth.

While other refractory metals may be used, satisfactory filaments have been made of tungsten wire of a suitable gauge flattened by rolling to form a strip approximately 0.0002 inch thick and approximately 0.002 inch wide. Each end of the filament 24 may be held or clamped to its respective support member 20 or 22, in electrical contact therewith, by a strip 24c or equivalent which together with the filament is welded or otherwise affixed to the support member. The filament and its mounting lend themselves to bakeout and aging techniques which, as will be better understood hereinafter, are important in a gauge in accordance with my invention. Filaments of the type described have been used in optical pyrometer lamps as more fully set forth in my U.S. Pat. No. 2,176,087. Experience has shown that the central section of the filament must not be appreciably curved if low internal friction is to be attained.

The filament 24 in a vacuum or pressure gauge in accordance with my invention may be set into vibration by tapping the glass envelope 12. After calibration measuring the half-delay time by optical means becomes a measure of the vacuum in which the filament vibrates. However, it is desirable to supply a permanent magnet 28 removably mounted in a manner to bring its poles into alignment with the filament preferably near the center thereof as shown in FIG. 1. With this latter arrangement it is then possible to pass a current through the filament to initiate vibration thereof and thereafter measure the voltage generated by the filament vibrating in the magnetic field in a manner to be described with reference to FIG. 3.

Figure 3:
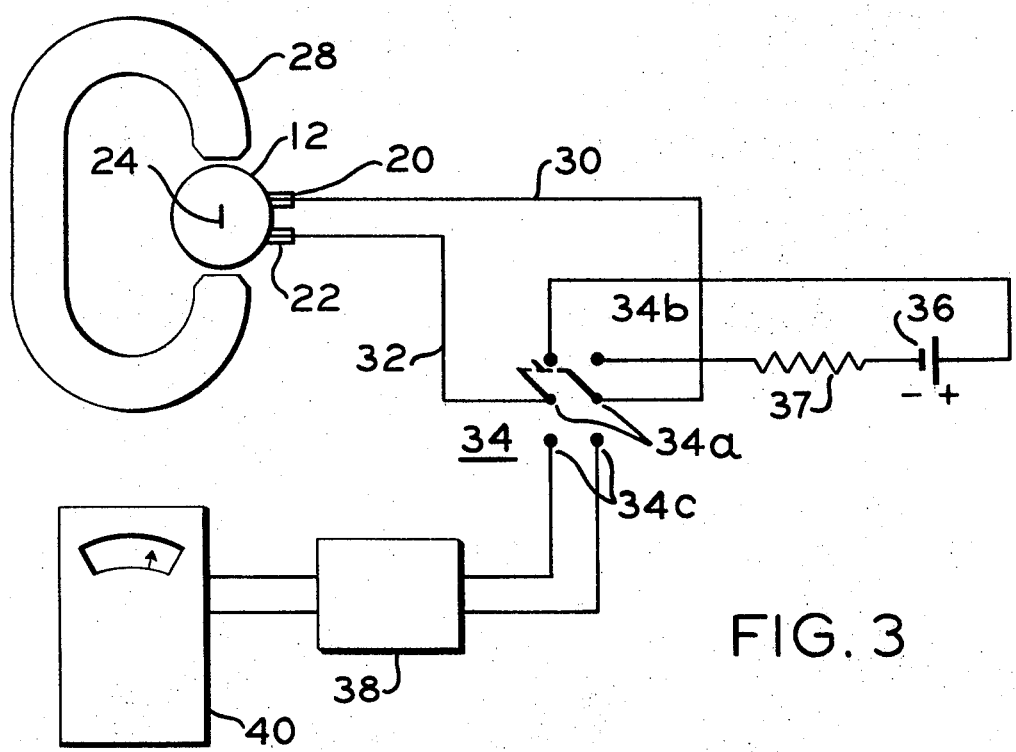
FIG. 3 is a diagram showing one manner of operating a gauge in accordance with this invention.

Referring to FIG. 3, there is shown diagrammatically the glass envelope 12 of FIGS. 1 and 2 supporting the filament 24 in the field of the magnet 28. Connected to the supports 20 and 22 respectively are conductors 30 and 32 which terminate at the common contacts 34a of a double-pole, double-throw switch 34. Connected in series to the contacts 34b of switch 34 is a source of potential 36 which may comprise a 1½ volt dry battery and a 235-ohm resistor 37. The permanent magnet 28 produces a uniform magnetic field of several hundred gauss. For example, a field of 700 to 1,000 gauss will be found satisfactory.

If the filament 24 comprises a ribbon of tungsten approximately 2 mils wide, 0.2 mil thick, and 1 inch long having four right angle bends as above described with reference to FIG. 1, its natural frequency of vibration in a plane perpendicular to the flat face of the filament lies between about 60 and 70 cycles per second. While filaments of the foregoing dimensions have been the type used to date, it will be found desirable to alter the dimensions in a manner to produce a filament having a natural frequency of the order of 75 to 85 cycles thereby to avoid vibrations induced by 60-cycle-power equipment.

Momentary closure of the blades of switch 34 on contacts 34b will cause a pulse of direct current of about 5 milliamperes to flow through the filament 24 which will react with the field of the permanent magnet 28 laterally to displace the filament thus to initiate vibration of the filament across the magnetic field. With the switch 34 in its open position the amplitude of the vibrations of the filament 24 will gradually decay and eventually die out in a length of time dependent upon the kind and pressure of gas in the envelope 12 as is well known to those skilled in the friction gauge art. The half-delay time of the filament 24, i.e., the time required for the amplitude of the vibrations at any instant to decrease to one-half the amplitude may be measured by observing the vibrating element with an optical device and measuring the decay time with a stop watch. However, it has been found desirable to connect to the contacts 34c of the switch 34 a suitable amplifier 38 and an electronic voltmeter 40. With this arrangement after the filament 24 is set into vibration by momentary closure of switch 34 onto contacts 34b and the switch blades closed on contacts 34c vibration of the filament 24 in the magnetic field will generate a voltage. As the amplitude of the vibrations decrease the voltage indicated on the electronic voltmeter will decrease and when the filament ceases to vibrate the voltage becomes zero. The half-delay time may be measured by observing the voltmeter together with a stop watch and noting the time required for the voltage to decrease from an initial value to one-half the initial value. Those familiar with the friction vacuum gauge art will be aware of the fact that instead of determining decay time in the manner described one may employ any of many optical or electrical techniques to determine decay time and relate it to pressure or as indicated in the above-mentioned article by W. Becker or that by Drawin, an electrical system may be employed to maintain the amplitude of vibration of the vibrating element, such as the filament 24, constant and calibrate the vacuum gauge in terms of the input power versus vacuum. Inasmuch as such mechanisms and procedures per se form no part of the present invention they will not be described herein.

Heretofore, it has been indicated by many skilled in the art that damping of the vibrating element of a friction-type vacuum gauge was primarily the result of two types of energy loss mechanisms. One of these was believed to be a friction loss created by the molecules of a gas striking the vibrating element such that depending on the nature of the gas and the molecular weight of the gas particles, the rate of decay of the vibrations of the filament would be a function of the amount and kind of gas present. The other loss mechanism was believed to involve the internal friction of the material from which the vibrating element was made.

Figure 7:
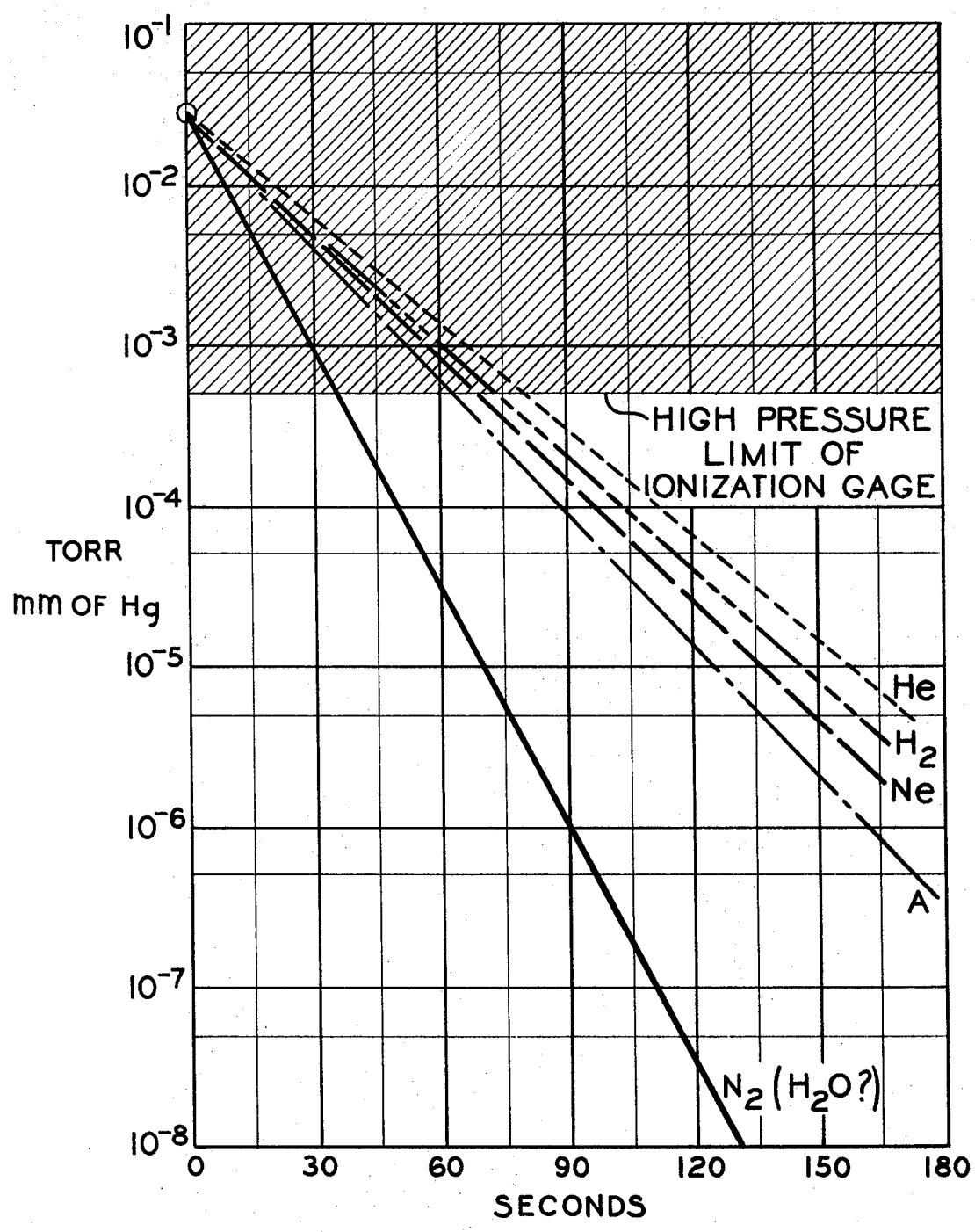
FIG. 7 is illustrative of calibration curves for a gauge in accordance with my invention, each curve being for a different residual gas.

As indicated already, applicant has discovered that when using vibrating elements of the form disclosed in this application that if the glassware of the system is carefully baked out at a temperature in excess of about 700° F. while the filament is outgassed by passing a current of from 100 to 125 milliamperes through it for an hour or more the loss mechanism due to internal friction appears to be insignificant and that for vacuums wherein the pressure is less than $10^{13}$ Torr. there appears a third loss mechanism heretofore either not observed or at least not recognized. When endeavoring to calibrate vacuum gauges each employing as a vibratory element a tungsten filament having a shape similar to filament 24a of FIG. 4 it was found, using different gases in the system, that for pressures measured by an ionization gauge in the range of $10^{13}$ to $10^{18}$ Torr. the calibration data for a number of similar filaments on three different systems yielded straight line plots on semilog graph paper when the logarithm of the pressure was plotted against decay time in seconds. However, instead of the curve for each gas appearing in the order of the square root of the molecular weight of the gas as would be expected in accordance with generally accepted theories these curves appeared in the order of their physisorption energies on tungsten (see FIG. 7). It was also found that decay times were achieved which were materially longer than those calculated to be obtainable in view of the internal loss mechanism in accordance with the previous theories. From these results it was postulated that if the internal loss mechanism of the vibrating element can be minimized, damping of the vibrating element will become dependent not only on the number of collisions with molecules of gas existing in the vicinity of the element and upon the internal friction of the material of the vibrating element but is further dependent upon the quantity of adsorbed gas on the surface of the vibratory element. As already mentioned, this gas is more like a liquid in density than the surrounding gas. At lower pressures it is to be expected that the quantity of adsorbed gas diminishes as the pressure is reduced. This postulated change in the quantity of adsorbed gas is believed to change the energy loss factor characterized as friction due to back and forth movement of this quasi-liquid coating along a vibrating filament. The specific viscosity of a liquid is of the order of one thousand times that of a gas at atmospheric pressure, and perhaps a billion times that of a gas at $10^{13}$ Torr, hence a measurable loss is the result. In FIG. 7 there are plotted calibration curves showing decay time in seconds as a function of vacuum in units Torr for different gases. The curve for $N_2$, due to its wide displacement from a curve for argon may well have been predominantly water vapor. The system was operated by employing recommended bakeout and outgasing procedures followed by flushing the system with a different gas, one gas at a time. The following gases A, Ne, $H_2$, and He were used and the correspondingly labeled curves plotted.

There are two aspects of gas adsorption in the free molecular flow domain below $10^{13}$ Torr that are believed to have a bearing on this gauge performance at low pressures. The first is the heat of adsorption for the various gases, and the second is the relationship between the time a monolayer can be formed on a clean (gas-free) surface and the surrounding gas pressure.

It is well established that the heat of adsorption, i.e., the energy to desorb a mol of adsorbed gas from a surface varies from gas to gas. Since the energy in the adsorbed film is determined by the temperature of the substrate, the kind of gas on a filament can be determined by ascertaining the temperature of the filament just able to desorb the gas. If the ambient temperature of the gauge is held constant it suffices to determine the current required to desorb the gas. The desorption of gas from the filament is accompanied by a sudden rise in the pressure of the system to which the gauge is connected. The pressure rise can be observed on another gauge on the system, for example, an ionization gauge or another gauge of the same type as described here.

In general, however, in modern vacuum practice the gas (residual) identification is of primary interest at very low pressures, for example, below $10^{18}$ Torr. At these ultrahigh vacuum the relationship between the time a monolayer can be formed on a clean (gas-free) surface and the surrounding gas pressure can be used to dispense with separate gauge means. It is well known that the time required to establish a monolayer on a clean surface is inversely proportional to the gas pressure and is approximately 1 second at $10^{16}$ Torr. Consequently at $10^{18}$ Torr. a time of 100 seconds is required. It follows then that if the existing film of gas is driven off after a decay time is measured a promptly executed remeasurement of the decay time will result in a much longer decay time because the damping occasioned by the gas film on the filament is absent since the prior art molecular damping is insignificant at such low pressure.

If the user has a list of the currents required to desorb the various gases of interest — determined on pure gas samples — he can establish the successively higher currents with intervening decay time measurements to determine the gases desorbed from the gauge filament when the gauge is employed on a system which contains a mixture of gases.

If the user, on the other hand, has no interest in the gas composition but wishes to be doubly sure of the pressure in this ultrahigh vacuum region, he can use the highest tabulated current to make sure all gas is temporarily removed from the surface of the filament and determine by successive decay time measurements the time it takes to reestablish the original decay time with the equilibrium gas adsorbed film. If, for example, the time so determined is 100 seconds, he is assured that the vacuum is approximately $10^{18}$ Torr. regardless of the composition of the gas. It is assumed here that the theoreticians are correct who assert that the gas layer on a metal surface is only one molecule deep. This method in conjunction with the decay time provides a rough check on the composition of the residual gas.

Figure 4:
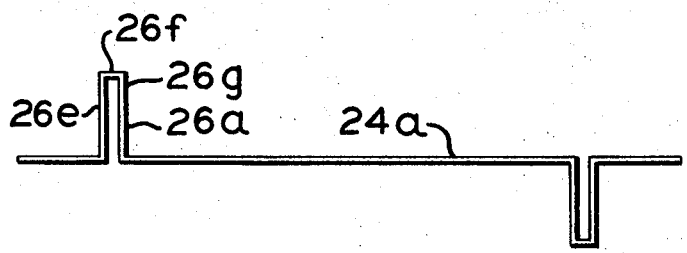
FIGS. 4—6 disclose other filament shapes which may be used in a gauge in accordance with my invention.
Figure 5:
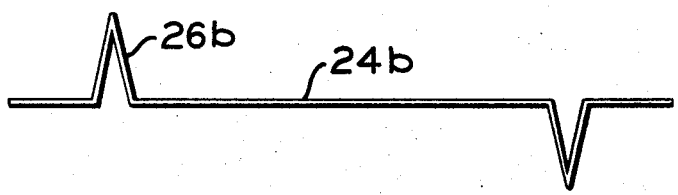
Figure 6:
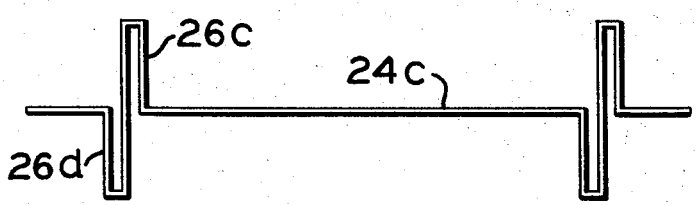

FIGS. 4, 5 and 6 are illustrative of other forms of filament structures which may be substituted for filament 24 in FIGS. 1, 2 and 3. In FIG. 4 filament 24a illustrates a presently preferred shape of filament wherein the oppositely disposed and symmetrically formed lateral extensions or bent portions 26a are accurately formed with right angles. The filament 24b illustrated in FIG. 5 shows the extending portions 26b having a V shape. Filament 24c of FIG. 6 shows double extending portions 26c and 26d.

In addition to the alternative forms illustrated, other forms of low internal loss vibratory elements may be devised. For example, the portions 26e of FIG. 4 may be omitted and the filament supported at points 26f or 26g. Additional ways may be thought of whereby a vibrating element is formed and supported in a manner to reduce the effect of internal loses of the type which exists when a straight filament is tensioned at its extremities or a flat plate or diagram is supported directly from its edges. As already mentioned, the molecular damping is insignificant at such low pressure and applicants invention is directed to unmasking and using the effects of molecules adsorbed on the vibrating element.

In the pressure region above $10^{12}$ Torr the molecular damping of the prior art exists which is proportional to the pressure The gauge used to obtain the FIG. 7 curves yields a decay time of 2 seconds at $5 \times 10^{12}$ Torr and 1 second at $10^{11}$ Torr. In consequence, the gauge can be operated over a very wide range and can be used to replace the customary two gauges of commercial practice — the thermocouple gauge down to $10^{13}$ and the ionization gauge at lower pressures.

What I claim is:

1. A vacuum gauge structure comprising:
   rigid mounting means for supporting a vibratable element in a vacuum,
   a vibratable element including one or more bent portions for reduction of internal friction losses calibratable in terms of pressure and a characteristic of its vibrations as related to pressure,
   said vibratable element being mounted on said support means in a manner to include said one or more bent portions as movable portions of said element, and
   means for mounting said supported vibratable element in a vacuum system the pressure of which is to be measured.

2. A vacuum gauge structure according to claim 1 including means for establishing a magnetic field across the path of movement of said vibratable element.

3. A vacuum gauge structure according to claim 2 including means for controllably passing electric current through said vibratable element to effect motion thereof in said magnetic field.

4. A vacuum gauge structure according to claim 2 including means for measuring an electrical quantity generated by mo-

PO-1050
(5/69)

UNITED STATES PATENT OFFICE
CERTIFICATE OF CORRECTION

Patent No. 3,583,227                     Dated June 8, 1971

Inventor(s) Raymond C. Machler

It is certified that error appears in the above-identified patent and that said Letters Patent are hereby corrected as shown below:

In the ABSTRACT: line 4, "ekement" should read --element--.
                 line 11, "eeatures"   "    "  --features--.

Col. 1, line 16, "$10^{14}$Torr." should read --$10^{-4}$Torr--.

" line 24, "$10^{13}$Torr." should read --$10^{-3}$Torr--.

" line 26, "$10^{15}$Torr." should read --$10^{-5}$Torr--.

" line 47, "$10^{16}$Torr." should read --$10^{-6}$Torr.--.

" line 62, after "practice" delete the comma.

" line 75, "$10^{114}$" should read --$10^{-14}$--.

Col. 2, line 26, "$10^{14}$Torr." should read --$10^{-4}$Torr--.

" line 43, "$10^{13}$Torr." should read --$10^{-3}$Torr--.

Col. 3, line 26, "has" should read --had--.

" line 28, "24a 24b" should read --24a to 24b--.

" line 59, "half-delay" should read --half decay--.

Col. 4,

" line 26, "half-delay" should read --half-decay--.

" line 40, "half-delay" should read --half-decay--.

" line 74, "$10^{13}$Torr." should read --$10^{-3}$Torr--.

UNITED STATES PATENT OFFICE
CERTIFICATE OF CORRECTION

Patent No. 3,583,227      Dated June 8, 1971

Inventor(s) Raymond C. Machler      PAGE - 2

It is certified that error appears in the above-identified patent and that said Letters Patent are hereby corrected as shown below:

(contd)

Col. 5, lines 5 and 6, "$10^{13}$ to $10^{18}$ Torr." should read --$10^{-3}$ to $10^{-8}$ Torr--.

" line 35, "$10^{13}$ Torr" should read --$10^{-3}$ Torr--.

" line 47, "$10^{13}$ Torr" should read --$10^{-3}$ Torr--.

" line 69, "$10^{18}$ Torr." should read --$10^{-8}$ Torr.--.

" line 70, "vacuum" should read --vacuua--.

" line 75, "$10^{16}$ Torr." should read --$10^{-6}$ Torr.--.

" line 76, "$10^{18}$ Torr." should read --$10^{-8}$ Torr--.

Col. 6, line 20, "$10^{18}$ Torr." should read --$10^{-8}$ Torr.--

" line 40, "loses" should read --losses--.

" line 48, "$10^{12}$ Torr" should read --$10^{-2}$ Torr--.

" line 49, after "pressure" add a period.

" line 51, "5 x $10^{12}$ Torr and 1 second at $10^{11}$ Torr." should read --5 x $10^{-2}$ Torr and 1 second at $10^{-1}$ Torr.--.

" line 54, "$10^{13}$" should read --$10^{-3}$--.

Signed and sealed this 8th day of February 1972.

(SEAL)
Attest:

EDWARD M. FLETCHER, JR.
Attesting Officer

ROBERT GOTTSCHALK
Commissioner of Patents